United States Patent
Schmidt

[15] 3,654,395
[45] Apr. 4, 1972

[54] SYNCHRONIZATION OF TDMA SPACE DIVISION SATELLITE SYSTEM

[72] Inventor: William George Schmidt, Rockville, Md.
[73] Assignee: Communications Satellite Corporation

[22] Filed: Oct. 15, 1969
[21] Appl. No.: 866,659

[52] U.S. Cl. ..........................179/15 BS, 343/100 ST, 325/4
[51] Int. Cl. ..........................H04j 3/06
[58] Field of Search ..........................179/15 BS; 325/4, 58, 39; 343/100 ST

[56] References Cited

UNITED STATES PATENTS 3,532,985 10/1970 Glomb..........................179/15 BS
3,418,579 12/1968 Hultberg..........................325/4

*Primary Examiner*—Kathleen H. Claffy
*Assistant Examiner*—Tom D'Amico
*Attorney*—J. Frank Osha

[57] ABSTRACT

Method and apparatus for synchronizing signals transmitted by a first group of earth stations via a communications satellite to a second group of earth stations is provided. The communications satellite utilizes spot beam transmitting antennas which are positioned such that earth stations are unable to monitor their own transmit signals. One earth station in each group of stations receives all signals from the other group of earth stations, performs appropriate synchronization computations, and retransmits synchronizing information to said other group of stations.

6 Claims, 4 Drawing Figures

SYNCHRONIZATION OF TDMA SPACE DIVISION SATELLITE SYSTEM

BACKGROUND OF THE INVENTION

This invention relates generally to communications systems and more particularly to means for a method of synchronizing the timing of transmissions from stations operating in a time-shared communications system.

In communications systems employing a repeater or transponder to relay transmissions from transmitting stations to receiving stations, such as satellite communications systems, the transmissions from the transmitting stations can be time division multiplexed (TDM) through the transponder. Each station transmits on the same frequency during time slots that are non-overlapping at the repeater. Each station may, therefore, occupy the entire repeater frequency bandwidth during its transmission time slot thus avoiding intermodulation products within the transponder since only one carrier is present at any one instant of time.

In a digitally encoded system, each station sharing a transponder transmits periodically a burst comprising digital code words that identify the transmitting station and that permit demodulation at the receiver of the transmitted digital information. Such a system may use, for example, pulse code modulation with phase shift keying of the carrier (PCM/PSK).

It is apparent that the successful operation of such a system depends on the non-overlapping of the interleaving bursts in the transponder; in other words, the burst transmissions from all of the stations in the network must be properly synchronized. Prior art synchronization systems for TDM satellite communication require each station to monitor its own transmissions and to make time measurements and adjustments with respect to bursts from a reference station. An example of such a prior art system is described in U.S. patent application Ser. No. 594,921, filed Nov. 16, 1966, now U.S. Pat. No. 3,562,432 by Ova G. Gabbard and assigned to the assignee of the present application. For example, if four stations, A, B, C, and D, share a transponder, dividing it into equal time slots, and transmit consecutively in that sequence, then a synchronizing pulse producing code word in station A's transmission burst can be used as a reference for stations B, C, and D. Station C knows that its time slot is a particular time after station A's. Thus by receiving both its own and A's transmission and measuring the time between its sync pulse and station A's sync pulse (the reference) it will know whether it is synchronized and if it should adjust its burst initiation time.

One factor importantly affecting the communications capacity of a satellite includes its effective radiated power toward a ground receiving station (the down-link). Thus, to the extent that ground stations are located in the same general area, the satellite capacity can be increased by employing highly directive antennas at the satellite that are focused to provide spot-beams toward the ground stations. Such a system can be practically utilized between North America and Europe, two areas having heavy traffic requirements for each other. A satellite spot-beam arrangement in this case could, for example, utilize a satellite over the Atlantic Ocean having two transponders; the first would be connected to an eastward spot beam to handle up-link TDM bursts from the European stations, and a westward down-link to direct the bursts to U.S. and Canadian stations. The second transponder in the satellite would be connected to westward and eastward spot beams which could handle the return path. In the alternative, it is also possible to utilize global receiving antennas and wherein spot beam antennas are discussed use of global receiving antennas may be substituted.

Obviously, a satellite communications system utilizing spot beams as described cannot function with prior art synchronization schemes because the transmitting stations cannot receive their own signals; a transmitted signal in such a system is received only by those stations in the area "illuminated" by the down-link spot beam.

SUMMARY OF THE INVENTION

Accordingly, one object of this invention is to provide *improved means* for synchronization in a TDM communications system.

Another object of the present invention is to provide an *improved method* for synchronization in a TDM communications system.

Still another object of the invention is to provide synchronization in a TDM communications system when a station does not monitor its own received signal.

Briefly, in accordance with one embodiment of the invention, these and other objects are attained by providing a communications satellite system operating in a time division multiple access mode, wherein a number of earth stations transmit bursts of information through the satellite transponder, the satellite further including spot beam transmit and receive antennas, each of which "illuminates" only some of the ground stations operating in the system. One station in the group of stations receiving TDM transmissions from a satellite spot beam antenna detects the synchronizing signals contained in the transmission bursts of each of the transmitting stations, and compares these synchronizing signals in time to a reference signal (which may be the synchronizing signal from one of the transmitting stations). This one station then generates an error signal or signals representing the deviation of the signals of the various stations from their appropriate relationship with the reference signal and transmits these error signals to the first group of stations. These stations then use the error information to adjust the timing of their subsequent transmission bursts.

DESCRIPTION OF THE PREFERRED EMBODIMENT

Figure 1:
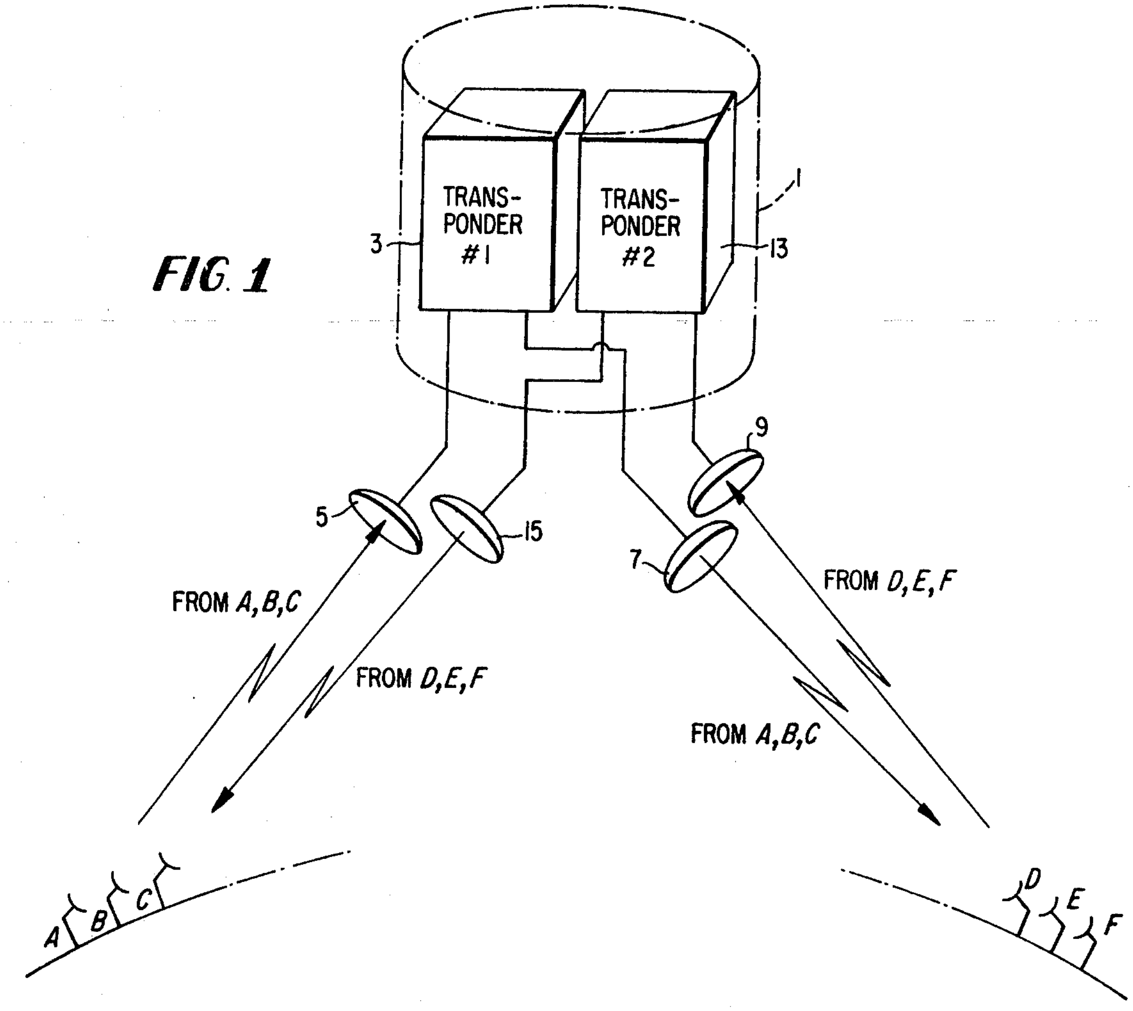

Referring now to the drawings wherein FIG. 1 shows an earth orbiting satellite having two transponders therein. A first transponder 3, of convention design, is connected to a highly directional antenna 5 in order to receive electromagnetic signals from earth stations A, B, and C that are time-division multiplexed and on the same frequency. Antenna 5 is of such design and orientation so as to have a spot beam reception pattern directed at stations A, B, and C. Antennas sufficient to meet these requirements are well known in the art, for example, the horn, disk, or yagi. The particular antenna chosen forms no part of this invention. Signals from earth stations D, E, and F are outside the reception pattern of antenna 5 and therefore are not received at the input to first transponder 3. Received signals from station A, B, and C are processed by transponder 3, which amplifies and retransmits them through antenna 7 which is oriented so as to project a spot beam toward earth stations D, E, and F. In a like manner, signals from stations D, E, and F are received on a directional antenna 9, processed by a second transponder 13 and beamed toward stations A, B, and C by a directional antenna 15. All four antennas may be essentially of the same design so as to have a spot beam transmission/reception pattern toward the desired earth stations.

Figure 2:
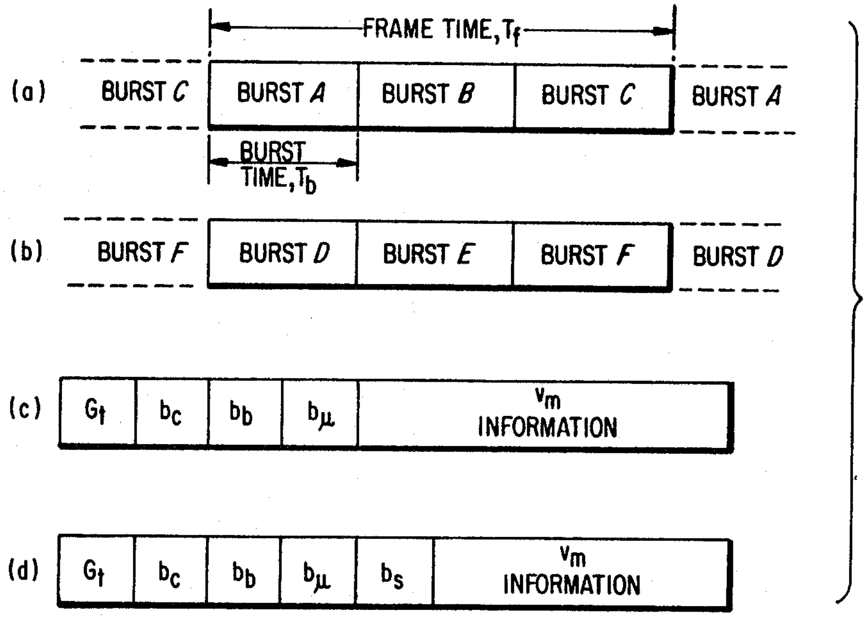

FIG. 2 shows the details of the signal bursts transmitted from stations A, B, and C. FIG. 2*a* illustrates the frame format through the first transponder 3. A frame is a complete sequence of bursts from all stations using a transponder; thus a frame through transponder 3 consists of the burst from station A, station B, and station C, respectively. In a like manner the frame through transponder 13 consists of consecutive bursts from stations D, E, and F as shown in FIG. 2b.

The typical burst format for a single station is shown in FIG. 2*c*. A guard time G allows for variation in synchronization accuracy; $b_c$, the carrier recovery time consists of an unmodulated carrier period in order to permit the receiving equipment to lock onto the received carrier frequency; $b_b$, the bit timing recovery time, which may be a 101010, etc., sequence, permits synchronization of the receive station clock with the received signal so as to achieve proper demodulation of the digitally encoded signals; $b_u$, the unique word or station code, identifies the transmitting station and also provides a synchronizing pulse which is used in this invention as described in more detail hereinafter; and $V_m$, the information carrying bits, conveys voice, data or other information that is being communicated.

According to the invention, one of the stations transmitting through each transponder is chosen to monitor the received signals from the stations using the other transponder in order to make synchronization measurements on the latter signals. Assuming in this example that station B is chosen, it must then provide stations D, E, and F with information regarding their synchronization or time spacing with respect to each other. In like manner, station D, E, or F must provide the same information for stations A, B, and C. As explained hereinbefore, the measurements cannot be made according to prior art systems and methods because a particular station cannot receive its own signal and cannot, therefore, calculate and provide its own synchronization corrections. Thus FIG. 2*d* shows the burst format for station B, having an additional time period $b_s$ between its unique word, $b_u$, and its information, $V_m$. As described more fully hereinafter, the $b_s$ period, provides each station transmitting through the other transponder with data as to its synchronization so that it may correct for synchronization errors or cease transmitting in the case of a complete synchronization loss. It is to be understood that the system of the present invention provides for synchronization after the initial acquisition of synchronization and does not provide for synchronization acquisition.

Figure 3:
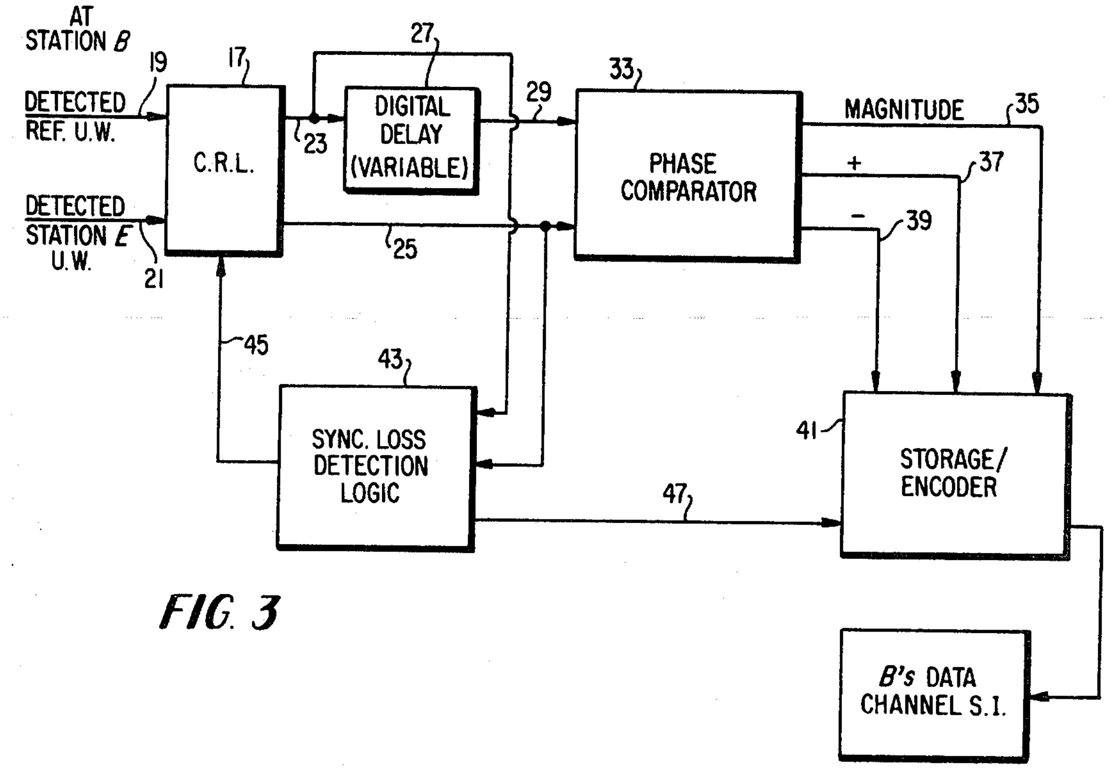

FIG. 3 shows that portion of the synchronization equipment relating to stations D, E, and F that is located at station B. It will be apparent that stations A or C could also provide measurements for one or more of the stations D, E, and F, but that a savings in equipment can be achieved by choosing a single station to provide the functions for all stations. It will also become apparent that any of stations D, E, or F could be used as a frame reference or that station B could use a highly accurate local clock as a frame reference. This description will assume that station D is used as a frame reference or standard; hence, no synchronization information need be transmitted by station B to station D since because stations E and F will be synchronized with respect to station D's transmission, station D's transmit time is not varied.

The synchronization pulses from reference station D's unique or code word are applied to a correction rate logic circuit 17 on line 19 and the synchronization pulses from station E's and F's unique words are applied to the correction rate logic circuit 17 on line 21. The unique words are detected by apparatus well known in the art and form no part of this invention. If the total burst time for each station is $T_b$, then in proper operation the unique word sync pulse from station E should follow the station D reference pulse by $T_b$ seconds and the pulse from station F will follow by $2T_b$ seconds; similarly, the Nth station's pulse follows the reference by $NT_b$ seconds. Of course, variations in satellite position, equipment parameters, and the like, will result in errors, causing the burst to follow at $(NT_b+e)$ sec. Therefore, information regarding *e* must be relayed to the transmitting station in order for it to adjust the initiation of its burst time relative to the reference in order to maintain synchronism. It should be recognized that this correction cannot be made more often than twice the round-trip signal propagation time to the satellite, $T_d$, because the effect of a previous error correction cannot be observed more frequently. For the case of a synchronous satellite the time is 300 milliseconds (300 msec) which is much greater than the 125 μsec frame length. Thus correction rate logic circuit 17 functions so as to pass only those pairs of pulses occurring in the same frame every $(2T_d+a)$ seconds (*a* is a value to compensate for satellite motion and equipment delays). A circuit of this type is described in the above-referenced U.S. Pat. No. 3,562,432, by Ova G. Gabbard. Therefore, every $(2T_d+a)$ seconds a pair of pulses separated by $(NT_b+e)$ seconds will appear on lines 23 and 25. The reference station pulse on line 23 is delayed $NT_b$ seconds by digital delay 27. For example, station D's pulse would be delayed $T_b$ seconds if the first burst following the reference station (d) burst was from station E. If station E is in proper synchronism then the delayed station D pulse on line 29 will be exactly in time phase with the station E pulse on line 25. Phase comparator 33 receives the pulses on lines 29 and 25 and may then provide outputs on any two of three on lines 35, 37 and 39, respectively, each describing the relationship of the pulses. Line 35 provides an indication of the magnitude of the time differential, if any, between the two sync pulses compared. An output is provided on line 37 if the line 25 pulse was received by phase comparator 33 before the delayed reference station pulse on line 29. An output is provided on line 39 if the line 25 pulse was received afterward. Circuits for providing these functions are described in the U.S. patent application Ser. No. 594,921, mentioned above. The information on lines 35, 37, and 39 is applied to a storage-encoder unit 41 that stores the information and encodes it for insertion into time slot $b_s$ in station B's burst. Circuits for providing these functions are well known in the art. In addition, a synchronization loss detection logic circuit 43 monitors the pulse on lines 23 and 25 to ascertain whether a pair of pulses has been received during a particular frame. If a pair of pulses has not been received during that frame, circuit 43 switches the operating mode of correction rate logic circuit 17 so that a pair of pulses is looked for every frame ($T_f$ seconds) instead of every $(2T_d+a)$ seconds. Logic circuit 43 is described in the aforementioned U.S. Pat. No. 3,562,432. If after a predetermined time, $T_k$, a pair of pulses in the same frame has not been found, synchronization is considered lost and this information is provided on line 47 to storage encoder 41 for transmission to station E via the $b_s$ time slot.

Figure 4:
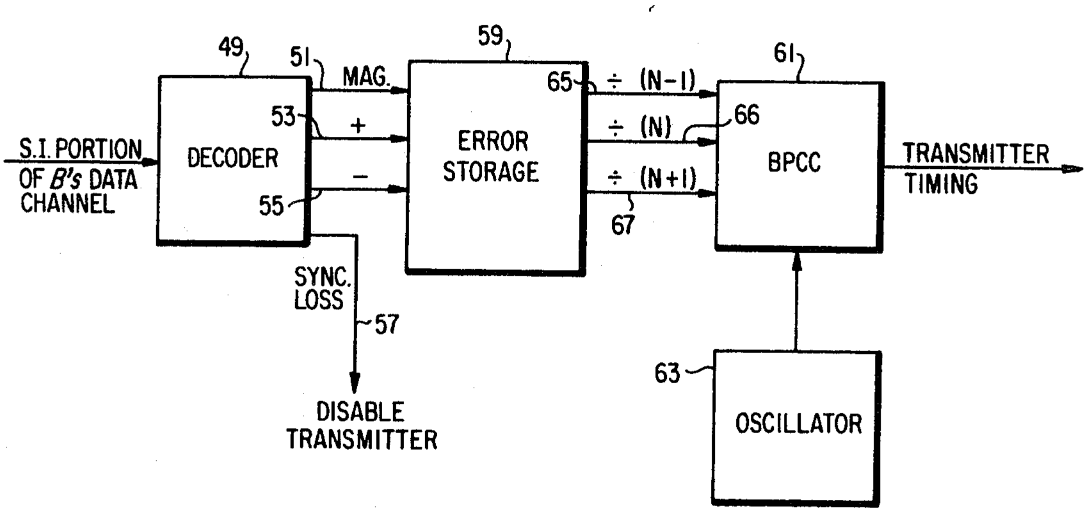

The apparatus at station E for utilizing the synchronization information transmitted on station B's $b_s$ time slot destined for station E is shown in FIG. 4. The $b_s$ information is decoded in a conventional decoder 49 that provides outputs on four lines 51, 53, 55, and 57 indicating respectively, the sync error magnitude, whether positive, whether negative, and whether sync loss has occurred. If an output appears on line 57, indicating sync loss, station E's transmitter is disabled. Error storage unit 59 receives the sync error information on lines 53, 55, and 57. Burst position control counter (BPCC) 61 controls all timing functions for station E's transmission bursts. Ordinarily station E transmits a burst every 125 μsec. If an oscillator 53 operates at 6.176 MHz, then a pulse is produced every 125 μsec if BPCC 61 divides by N=772 (772 is the number of bits in a frame; a bit is 160 nanoseconds). Obviously, in order to adjust the burst initiation time, BPCC must divide by a number other than 772. Thus, error storage unit 59 provides a signal on line 65 or 67 to indicate, respectively, that BPCC 61 should divide by (N−1) or (N+1). In the case of division by (N+1) the burst initiation is delayed by one bit and, conversely, division by (N−1) causes the burst to initiate one bit sooner. Thus the changes in burst time initiation are made in small steps to avoid any sudden loss in synchronization. Division by (N−1) or (N+1) continues until the magnitude signal on line 51 reaches zero. Details of logic circuits for BPCC 61 and error storage unit 59 are disclosed in the above-referenced U.S. patent application Ser. No. 594,921.

Although the invention has been described with respect to a particular embodiment, it will be recognized that other techniques and apparatus may be substituted therefor without departing from the teachings of the invention.

What is claimed is:

1. In a communications satellite system of time division multiple access type utilizing a satellite having spot beam antennas, wherein a plurality of earth stations communicate by sending bursts of information sequentially through the spot beams of the satellite and each earth station is unable to receive its own signals and each station's transmission includes a synchronizing signal, the method of synchronizing the information bursts of the stations in the system so that they do not overlap in the satellite, said method comprising the following steps:

a. detecting at one station the synchronizing signals occurring during the same time frame of two or more other earth stations;

b. comparing at said one station the time relationships of the synchronizing signals of each of said two or more stations, to a reference synchronizing signal;

c. generating at said one station error signals representing the deviations between the respective time relationships between the reference signal and the synchronizing signals of said two or more stations, and a predetermined time relationship;

d. transmitting to each of said two or more other stations said error signals; and e. controlling the time at which each of said two or more other stations transmit in response to said error signals.

2. The method of claim 1 wherein said error signals are transmitted to said two or more other stations by including said error signals in said one station's transmissions through the satellite.

3. The method of claim 2 wherein said reference synchronizing signal is chosen to be the synchronizing signal from one of said other stations.

4. The method of claim 3 wherein the step of detecting synchronizing signals at said one station is performed every $(2T_d+\alpha a)$ seconds, where $T_d$ equals the round trip time for a satellite transmission and a is a constant which is larger than the time variations caused by satellite motion and equipment delay.

5. The method of claim 3 wherein the step of detecting synchronizing signals at said one station is performed every $T_f$ seconds when a pair of pulses have not been received during a frame, where $T_f$ is the time for a complete sequence of bursts from said other stations.

6. In a communications satellite system of time division multiple access type utilizing a satellite having spot beam antennas, wherein a plurality of earth stations communicate by sending bursts of information sequentially through the spot beams of the satellite and each earth station is unable to receive its own signals and each station's transmission includes a synchronizing signal, apparatus for synchronizing the information bursts of the stations in the system so that they do not overlap in the satellite, said method comprising the following steps:

a. means for detecting at one station the synchronizing signals during a single time frame of two or more other earth stations;

b. means for comparing at said one station the time relationship of, the synchronizing signals of each of said two or more stations, to a referenced synchronizing signal;

c. means for generating at said one station error signals representing the deviations between the respective time relationship between the reference signal and synchronizing signals of said two or more stations, and a predetermined time relationship;

d. means for transmitting from said one station to each of said two or more other stations said error signals; and e. means at each of said two or more other stations for controlling the time at which each of said two or more other stations transmit in response to said error signals.

* * * * *